(12) United States Patent
Flener et al.

(10) Patent No.: US 9,121,470 B2
(45) Date of Patent: Sep. 1, 2015

(54) EFFECTIVE VIBRATION DAMPING ACROSS A BROAD TEMPERATURE RANGE

(75) Inventors: Michael J. Flener, Pleasant Ridge, MI (US); Bradley Gallagher, Royal Oak, MI (US); Eric Seifferlein, Clarkston, MI (US); David Stotera, Bloomfield Township, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 14/123,781

(22) PCT Filed: Jun. 7, 2012

(86) PCT No.: PCT/US2012/041322
§ 371 (c)(1),
(2), (4) Date: Mar. 7, 2014

(87) PCT Pub. No.: WO2012/170671
PCT Pub. Date: Dec. 13, 2012

(65) Prior Publication Data
US 2014/0230336 A1    Aug. 21, 2014

Related U.S. Application Data

(60) Provisional application No. 61/495,545, filed on Jun. 10, 2011.

(51) Int. Cl.
*B60J 5/00* (2006.01)
*F16F 15/02* (2006.01)
(Continued)

(52) U.S. Cl.
CPC .............. *F16F 15/02* (2013.01); *B60J 5/0412* (2013.01); *B60J 5/0452* (2013.01); *F16F 7/00* (2013.01)

(58) Field of Classification Search
CPC ...................................................... B60J 7/0425
USPC ........ 296/187.02, 146.6, 1.03, 120–122, 109; 293/120–122, 109
See application file for complete search history.

(56) References Cited

U.S. PATENT DOCUMENTS 3,917,332 A * 11/1975 Puleo .............................. 293/109
4,978,562 A * 12/1990 Wycech ....................... 428/35.8
(Continued)

FOREIGN PATENT DOCUMENTS

JP      59-006152    1/1984
JP      08-142758    6/1996
(Continued)

OTHER PUBLICATIONS

Translation of JP 59-009152, document cited by applicant.*
(Continued)

*Primary Examiner* — Dennis H Pedder
(74) *Attorney, Agent, or Firm* — Mary K. Cameron (57) ABSTRACT

Assemblies, methods and systems useful for reducing the noise and vibration characteristics associated with hollow spaces or cavities of vehicles by positioning damping foam material within and spanning the space between a first substrate surface and a second substrate surface. The damping foam material is comprised of a first region and a second region, wherein the first region has an E' value at −10° C. that is lower than the E' value at −10° C. of the second region and an E' value at 25° C. that is higher than the E' value at 25° C. of the second region; and the second region has a variable cross-sectional width.

16 Claims, 6 Drawing Sheets

(51) Int. Cl.
*B60J 5/04* (2006.01)
*F16F 7/00* (2006.01)

(56) References Cited

U.S. PATENT DOCUMENTS

| | | | |
|---|---|---|---|
| 5,160,465 | A | 11/1992 | Soderberg |
| 5,266,133 | A | 11/1993 | Hanley et al. |
| 5,385,951 | A | 1/1995 | Soderberg |
| 5,573,027 | A | 11/1996 | Hsiung |
| 5,631,304 | A | 5/1997 | Hasegawa |
| 5,708,042 | A | 1/1998 | Hasegawa |
| 6,150,428 | A | 11/2000 | Hanley et al. |
| 6,281,260 | B1 | 8/2001 | Hanley et al. |
| 6,830,799 | B1 | 12/2004 | Duffin et al. |
| 7,140,668 | B2 | 11/2006 | Wesch et al. |
| 7,199,165 | B2 | 4/2007 | Kassa et al. |
| 7,247,657 | B2 | 7/2007 | Duffin et al. |
| 2004/0026689 | A1 | 2/2004 | Bernds et al. |
| 2004/0266898 | A1 | 12/2004 | Kassa et al. |
| 2008/0017696 | A1 | 1/2008 | Urech et al. |
| 2008/0176969 | A1 | 7/2008 | Tahri et al. |
| 2009/0001758 | A1* | 1/2009 | Hanley et al. ............ 296/187.02 |
| 2010/0314813 | A1 | 12/2010 | Wojtowicki |

FOREIGN PATENT DOCUMENTS

| | | |
|---|---|---|
| JP | 2001-246995 | 9/2001 |
| WO | 2007/012048 A3 | 1/2007 |
| WO | 2007/117663 A3 | 10/2007 |
| WO | 2007/117664 A3 | 10/2007 |
| WO | 2008/021200 A1 | 2/2008 |

OTHER PUBLICATIONS

International Search Report for PCT/US2012/041322, 4 pages.

* cited by examiner

EFFECTIVE VIBRATION DAMPING ACROSS A BROAD TEMPERATURE RANGE

FIELD OF THE INVENTION

The invention relates generally to improved methods and systems useful for reducing the noise and vibration characteristics associated with hollow spaces or cavities of components such as vehicle doors having relatively thin panels.

BACKGROUND OF THE INVENTION

In recent decades, there has been an on-going effort to reduce the weight of vehicles in order to both save on material costs and to improve fuel economy. To decrease weight, vehicles have increasingly been designed to employ ever thinner metal sheets for exterior panel construction. However, an undesired consequence of such design changes has been poorer acoustic performance, which results in noticeably higher driving noise levels inside the car. Noise (vibration) may be generated, for example, by the engine, transmission or other mechanical moving parts of the vehicle. The acoustic vibrations generated by these sources are propagated throughout the vehicle so that they become audible or otherwise sensed by the occupants. These sound transmissions can be particularly caused by cavities or hollow spaces within the vehicle, such as the interior of a door, which can act as resonators. One solution to such problems has been to install sound-damping bulkheads or "pillar fillers," which typically are polymer-based compositions that start foaming when exposed to heat (such as when the paint applied to a vehicle is cured in an oven) and fill and seal cavities in order to prevent or at least dampen the vibrations from being transmitted. Sound-deadening patches comprised of polymeric materials which are applied to panel surfaces have also been employed.

Considerable effort has been devoted to improving the vibration damping properties of such expandable polymer-based compositions. For example, Henkel AG & Co. KGaA has introduced Terophon® HDF (high damping foam), which is capable of damping noise-producing vibrations extremely fast and efficiently. However, the high performance damping materials available at present tend to have such highly effective performance only within a relatively narrow temperature range. The specifications set by vehicle manufacturers typically require peak damping performance at or somewhat above room temperature (20-25° C.), and known materials showing good performance at room temperature have reduced performance at temperature extremes. In particular, at cold temperatures such as those encountered during winter months in many climates (−20 to −10° C.), the high performance damping materials generally become too stiff and exhibit very little intrinsic damping.

For example, a high damping foam becomes stiffer (exhibiting a higher E' value) as temperature decreases. The E' value (Young's storage modulus, which is measured by Dynamic Mechanical Analysis) is defined as the ratio of tensile stress to tensile strain below the proportional limit of a material. As the stiffness of the foam increases, it has the potential to change the boundary conditions of a specific application, such as when the foam is being used to dampen vibration within a vehicle door. This change in boundary conditions may create a localized area of high vibration, which could reduce the overall acoustic performance of the application. In the case of a particular door assembly studied by the inventors, as E' increased due to a lowering of the temperature of the door assembly containing a high damping foam, the vibration pattern on the door was found to change from three large displacement modes at 20° C. to six smaller displacement modes at −20° C.

Consequently, there is a need to develop ways of effectively damping vibrations within hollow structures such as vehicle doors over a broader temperature range than has previously been feasible.

BRIEF SUMMARY OF THE INVENTION

In one aspect of the invention, an assembly is provided which comprises a first substrate and a second substrate. A surface of the first substrate and a surface of the second substrate face each other and define a space between the first substrate and the second substrate. A damping foam material is positioned within the space and spans from the surface of the first substrate to the surface of the second substrate. The damping foam material is comprised of a first region and a second region, wherein the first region has an E' value at −10° C. that is lower than the E' value at −10° C. of the second region and an E' value at 25° C. that is higher than the E' value at 25° C. of the second region. The second region has a variable cross-sectional width, such as a triangular, oval, round, hourglass, trapezoidal or diamond shape.

Also provided by the present invention is a method for damping vibration in one or both of a first substrate and a second substrate arranged so that a surface of the first substrate and a surface of the second substrate face each other and define a space between the first substrate and the second substrate. The method comprises positioning a damping foam material within the space so that the damping foam material spans from the surface of the first substrate to the surface of the second substrate. The damping foam material is comprised of a first region and a second region, wherein the first region has an E' value at −10° C. that is lower than the E' value at −10 C of the second region and an E' value at 25° C. that is higher than the E' value at 25° C. of the second region. The second region has a variable cross-sectional width.

Yet another aspect of the invention provides an assembly comprising a substrate having a surface and an expandable material disposed on the surface of the substrate. The expandable material when expanded provides a damping foam material comprised of a first region and a second region, wherein the first region has an E' value at −10° C. that is lower than the E' value at −10° C. of the second region and an E' value at 25° C. that is higher than the E' value at 25° C. of the second region. The second region has a variable cross-sectional width.

A system for damping vibration in an automotive closure panel assembly is also provided by the present invention. The system comprises an intrusion device associated with an automotive exterior panel structure and an expandable material disposed over at least a portion of the intrusion device and in contact with the intrusion device prior to expansion of the expandable material and with an interior surface of the automotive exterior panel structure after expansion of the expandable material. The expandable material when expanded provides a damping foam material comprised of a first region and a second region, wherein the first region has an E' value at −10° C. that is lower than the E' value at −10° C. of the second region and an E' value at 25° C. that is higher than the E' value at 25° C. of the second region. The second region has a variable cross-sectional width.

In one embodiment of the invention as described herein, at least one of the first substrate or the second substrate is a thin metal or polymeric panel.

In one embodiment of the invention as described herein, the first substrate is an intrusion device associated with an automotive exterior panel structure.

In one embodiment of the invention as described herein, the intrusion device comprises a door intrusion beam.

In one embodiment of the invention as described herein, the second substrate is an automotive exterior panel.

In one embodiment of the invention as described herein, the second region may have a cross-sectional shape that is triangular, oval, round, trapezoidal or diamond-shaped.

In one embodiment of the invention as described herein, the second region or a plurality of second regions extends substantially from the surface of the first substrate to the surface of the second substrate.

In one embodiment of the invention as described herein, the plurality of second regions may have a cross-sectional shape that is triangular, oval, round, trapezoidal or diamond-shaped.

In one embodiment of the invention as described herein, portions of the first region are positioned on at least two sides of the second region or plurality of second regions.

In one embodiment of the invention as described herein, portions of the first region are positioned on and are in contact with at least two sides of the second region or plurality of second regions.

In one embodiment of the invention as described herein, the expandable material has been deposited on the surface of the substrate by extrusion.

In one embodiment of the invention as described herein, the expandable material is attached to the surface of the substrate by adhesive or mechanical means.

In one embodiment of the invention as described herein, the expandable material is comprised of at least one thermoplastic polymer and at least one heat-activated blowing agent.

In one embodiment of the invention as described herein, the expandable material is formed by co-extrusion.

DETAILED DESCRIPTION OF CERTAIN EMBODIMENTS OF THE INVENTION

Figure 1:
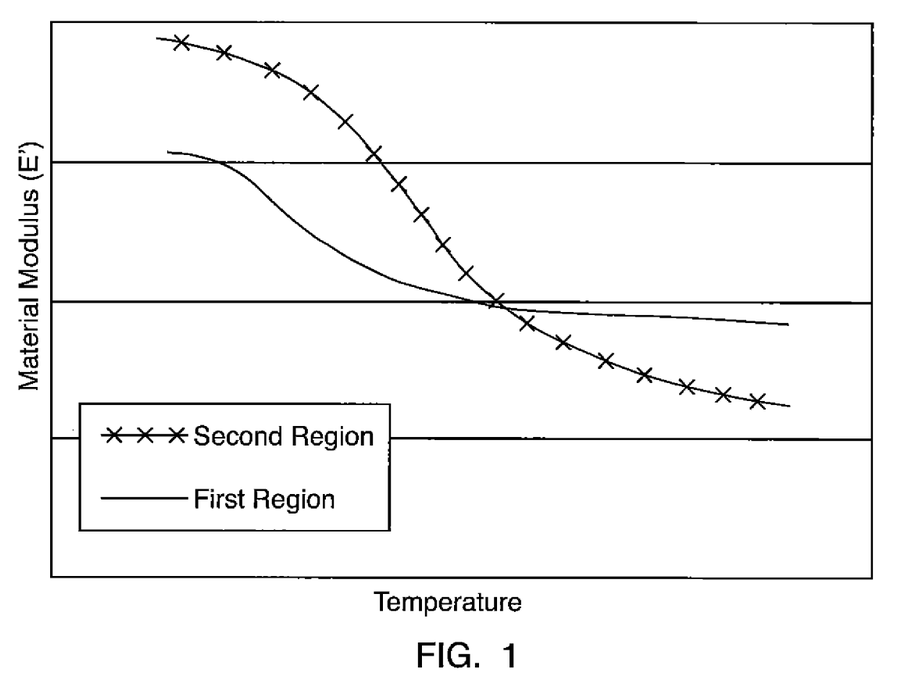
FIG. 1 illustrates the E' vs. temperature curves for two different illustrative foam materials capable of being used as the first region and the second region in the present invention.

The damping foam material utilized in the present invention is characterized by containing at least two foam regions having different E' values at both a relatively low temperature (−10° C.) and at a relatively high temperature (25° C.). As will be explained in more detail subsequently, the E' properties of each region as a function of temperature may be controlled as desired by formulating the foam of the first region and the foam of the second region such that different polymers or other constituents or the relative proportions thereof are varied between the different regions. In particular, a first region is provided which has an E' value at −10° C. that is lower than the E' value at −10° C. of the second region, but an E' value at 25° C. that is higher than the E' value at 25° C. of the second region. These characteristics may be generally illustrated by the graph shown in FIG. 1 of E' versus temperature for two foam region materials. The first foam region material may, for example, exhibit a relatively flat curve over the temperature range of −10° C. to 25° C. That is, although the first foam region material's E' value at −10 C is somewhat greater than its E' value at 25° C., the increase in stiffness is not nearly as pronounced as that exhibited by the second foam region material. That is, the E' value of the second foam region material of FIG. 1 is affected more significantly by temperature. The E' value of the second foam region material is advantageously low at about room temperature (15-30° C.), in particular lower than the E' value of the first foam region, thereby providing excellent acoustic performance (damping) under such conditions. However, at low temperatures the E' value becomes higher than that of the first foam region. This results in a deterioration of acoustic performance (vibration and sound reduction) at such lower temperatures, which might be encountered by a vehicle during winter months. Using either the first foam region material or the second foam region material alone in a damping foam material positioned between two substrates in an assembly (such as, for example, between an intrusion device and an exterior panel in a vehicle door) thus may not provide sufficient acoustic performance over a broad temperature range.

It has now been discovered that effective damping within the entire range of environmental conditions a vehicle may experience may be achieved by using at least two different foam materials in combination with each other, provided that regions of these different materials are arranged in a particular configuration. In accordance with the present invention, the second region in the damping foam material has a variable cross-sectional width, rather than having a uniform cross-sectional width. That is, when the damping foam material is viewed in cross-section, the width of the second region varies. More particularly, the width of the second region at a first line parallel to the surface of a substrate in contact with the damping foam material at a distance "a" from such surface is different from the width of the second region at a second line parallel to the substrate surface at a distance "b" from such surface. This feature is further illustrated in FIG. 5, which shows in cross-section an assembly 6 which is comprised of a first substrate 3 and a second substrate 4. A surface 7 of the first substrate 3 faces a surface 8 of the second substrate 4. A space 5 is thereby defined between the first substrate 3 and the second substrate 4.

Figure 5:
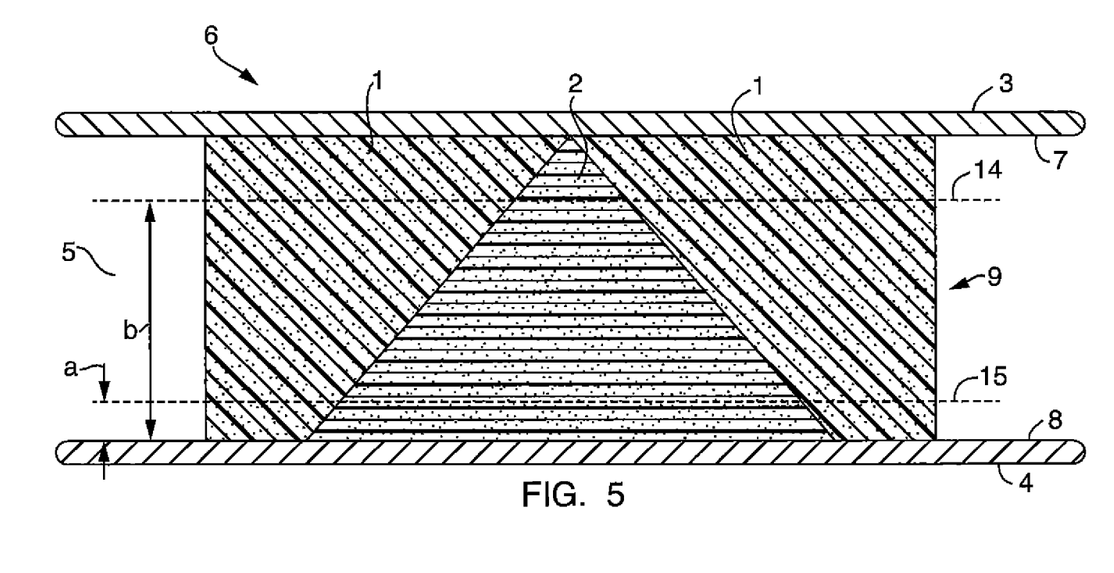
FIG. 5 illustrates an embodiment of the invention wherein a damping foam material having a first region and a second region is positioned between two substrates, wherein the second region has a non-uniform cross-sectional width and a generally triangular cross-sectional shape.

A damping foam material 9 is positioned within the space 5 and spans from surface 7 of the first substrate 3 to surface 8 of the second substrate 4. Damping foam material 9 is comprised of a first region 1 and a second region 2. The first region 1 has an E' value at −10° C. that is lower than the E' value at −10° C. of the second region 2. However, at 25° C., first region 1 has an E' value that is higher than the E' value of second region 2. Second region 2 has a variable cross-sectional width. The width of the second region 2 at a first line 15 parallel to substrate surface 8 at a distance "a" from such surface is different from (in this embodiment, greater than) the width of the second region 2 at a second line 14 parallel to substrate surface 8 at a distance "b" from such surface.

Typically, at least one portion of the first foam region material is positioned on, and is in contact with, at least one side of the second region. In one embodiment of the invention, portions of the first foam region material are positioned on and are in contact with at least two sides of the second region, as viewed in cross-section. In one aspect, the second region or a plurality of second regions extends substantially (e.g., at least about 75% or at least about 85% or at least about 90%) or completely from the surface of the first substrate to the surface of the second substrate. The width of the second region may vary from zero at its narrowest point to the full width of the damping foam material at its widest point, although in certain embodiments the widest point of the second region may be about 25% to about 75% of the overall width of the damping foam material at such point. The second region width may vary over the distance between the first and second substrate surfaces in a linear or non-linear fashion. In one embodiment, the second region may have a width that is zero or close to zero where it contacts the surface of the first substrate and a maximum width near or at the surface of the second substrate. In another embodiment, the second region may have a width that is zero or close to zero where it contacts both the first substrate surface and the second substrate surface and a maximum width at approximately the point midway between the two substrate surfaces. The maximum width of the second region may also be realized at some other point between the first and second substrate surfaces.

FIG. 2 shows, in cross-section, various embodiments of the present invention to illustrate, without intending to limit, possible different configurations of the first and second regions within the damping foam material.

Figure 2A:
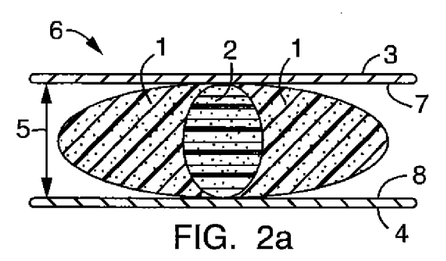
FIG. 2 shows cross-sectional representations of various exemplary damping foam materials having a first region and a second region in accordance with the invention.
Figure 2B:
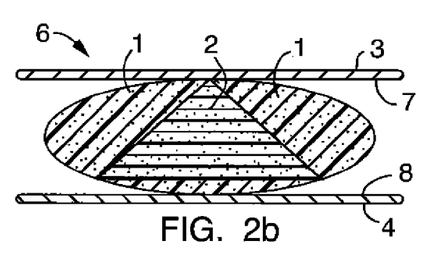
Figure 2C:
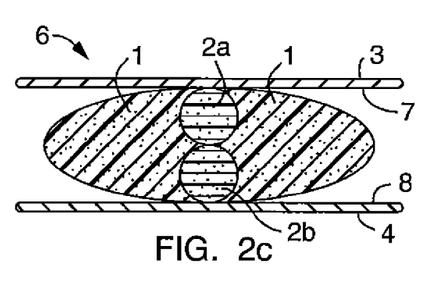
Figure 2D:
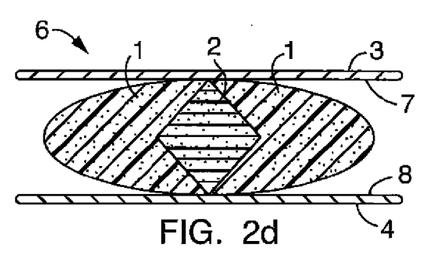
Figure 2E:
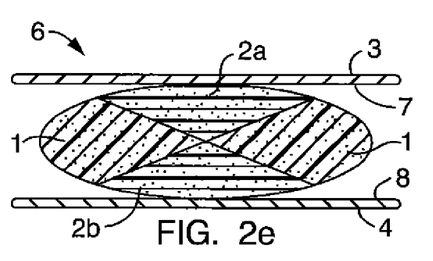
Figure 2F:
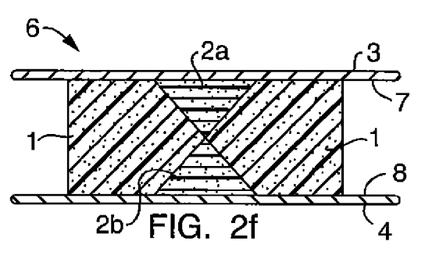
Figure 2G:
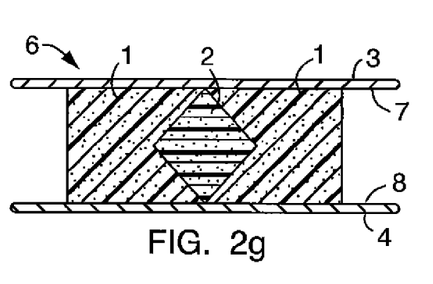
Figure 2H:
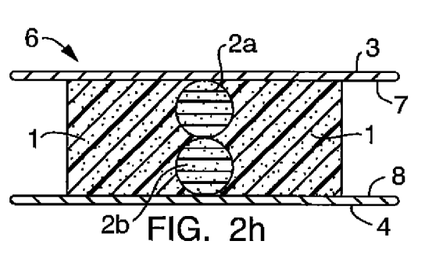
Figure 2I:
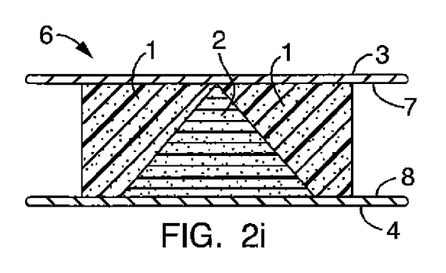
Figure 2J:
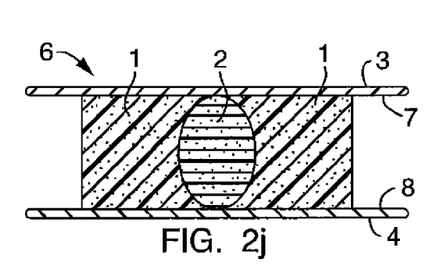
Figure 2K:
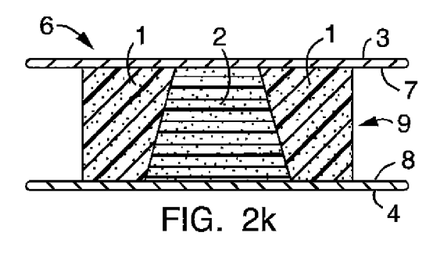
Figure 2L:
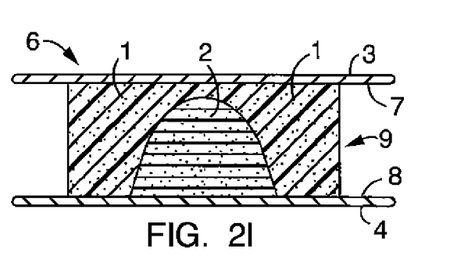
Figure 2M:
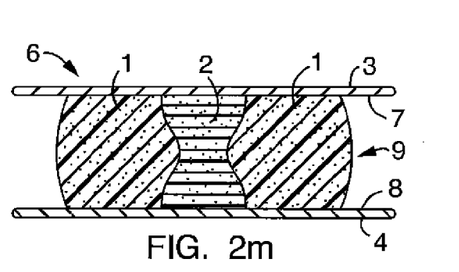
Figure 2N:
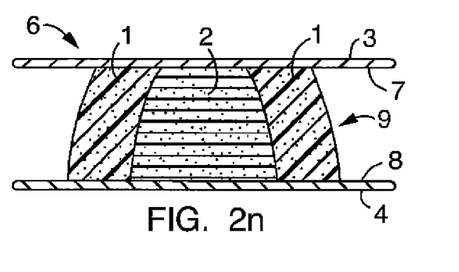

In each of FIGS. 2a-2n, an assembly 6 is shown in cross-section which is comprised of a first substrate 3 and a second substrate 4. A surface 7 of the first substrate 3 faces a surface 8 of the second substrate 4. A space 5 is thereby defined between the first substrate 3 and the second substrate 4. Although FIG. 2 shows substrates 3 and 4 as being flat and parallel to each other and of uniform thickness, it is understood that in other embodiments of this invention one or both of the substrates may be non-flat (e.g., curved) or contain surface irregularities or have a non-uniform thickness. Furthermore, the substrates need not be parallel to each other.

A damping foam material 9 is positioned within the space 5 and spans from surface 7 of the first substrate 3 to surface 8 of the second substrate 4. Damping foam material 9 is comprised of a first region 1 and a second region 2, each region having an E' value. The first region 1 has an F' value at −10° C. that is lower than the E' value at −10° C. of the second region 2. However, at 25° C., first region 1 has an E' value that is higher than that of second region 2. Second region 2 has a variable cross-sectional width. That is, the width of second region 2 varies when viewed in cross-section, i.e., its width is non-uniform in a direction between surface 7 and surface 8.

In certain embodiments (illustrated in FIGS. 2c, 2e, 2f and 2h), the second region 2 is present in two portions a first foam portion 2a and a second foam portion 2b which touch each other. The overall cross-sectional shape of damping foam material 9 may be oval (as illustrated in FIGS. 2a-2e) or rectangular (as illustrated in FIGS. 2f-2j), although other shapes such as square, trapezoidal, hexagonal or irregular or asymmetric shapes are also considered within the scope of the invention. The width of the damping foam material where it contacts one substrate may be the same as or different from the width of the damping foam material where it contacts the other substrate. The damping foam material may be widest at a point intermediate between the two substrate surfaces. The outer surfaces of damping foam material 9 not in contact with the substrate surfaces may be flat, curved, convex or concave, for example.

The second region 2 may have any of a number of different cross-sectional shapes, including, for example, oval (FIGS. 2a and 2j), triangular (FIGS. 2b, 2e, 2f and 2i), diamond-shaped (FIGS. 2d and 2g), trapezoidal (FIG. 2k), hexagonal (not shown), and hourglass-shaped (FIG. 2m). The second region 2 may extend completely from surface 7 of substrate 3 to surface 8 of substrate 4 (as illustrated in FIGS. 2a, 2c-2k, 2m and 2n) or nearly completely from surface 7 of substrate 3 to surface 8 of substrate 4 (as shown in FIGS. 2b and 2l). In certain embodiments of the invention, portions of first region 1 may be present on both sides of second region 2, which is centrally located within the damping foam material as viewed in cross-section.

In one particular embodiment of the invention, a vibration reduction and damping system for use in vehicle closure panels, such as doors and lift gates is provided, wherein an expandable material is disposed along at least one surface of an intrusion device prior to final assembly of the vehicle. The system may be activated as the vehicle undergoes a heating step (such as in a paint bake oven or chamber), which causes the expandable material to expand to provide a damping foam material having a plurality of regions having different characteristics and arranged in particular configurations as described elsewhere herein. The intrusion device with the expandable material disposed thereon may be positioned within the vehicle closure panel such that, upon activation and expansion, the expandable material expands towards and comes into contact with an outer panel, with the resulting damping foam material filling the gap between the intrusion device and the inner surface of the outer panel. For example, the surface of the intrusion device having the expandable material disposed thereon may be oriented and held in place so that such surface faces the inner surface of the outer panel. In one embodiment, the damping foam material may bond (adhere) to the outer panel inner surface.

The expandable material may be disposed on the surface of the intrusion device using any suitable method. In one embodiment, for example, the expandable material may be extruded in place directly onto such surface. Co-extrusion techniques known in the art may be adapted for such purpose, wherein two or more different compositions are co-extruded through dies. The compositions used to prepare the expandable material may be formulated to have hot melt adhesive characteristics. That is, such compositions are solid and preferably non-tacky at room temperature, but are capable of being rendered flowable or extrudable when heated. In their heated state, they can be extruded onto a surface and are sufficiently tacky (adhesive) that the extruded material remains adhered to the surface when the material cools to room temperature and re-solidifies. Typically, such an extrusion is carried out at a temperature sufficiently low so as to avoid premature activation of the expandable material (e.g., below the minimum temperature needed to trigger significant decomposition of a latent, heat-activated blowing agent present in the expandable material).

The expandable material may additionally or alternatively be held in place on the surface of the intrusion device by other fastening means, such as, for example, a separately applied adhesive layer or mechanical fastener (e.g., clips, pins, screws, bolts and the like). In one embodiment of the invention, a single portion of the expandable material is disposed on an intrusion device surface. Such single portion may entirely cover or only partially cover such surface. Where the substrate on which the expandable material is placed is elongated in shape, as is typically the case with intrusion devices such as side impact beams and the like, the single portion of expandable material may run the entire length or substantially the entire length of the substrate. In other embodiments of the invention, however, a plurality of expandable material portions may be disposed on the substrate in any suitable or desired pattern or spacing.

The longitudinal axis of the expandable material portion may be oriented such that it is parallel to the longitudinal axis of the substrate, but in other embodiments the longitudinal axis of the expandable material portion may have a different orientation such as, for example, perpendicular to the longitudinal axis of the substrate. If a plurality of expandable material portions is disposed on the substrate surface, they may have the same or different orientations relative to the longitudinal axis of the substrate.

The expandable compositions used to produce the different regions within the damping foam material obtained by activation and expansion of the expandable material may be selected from any of the suitable formulations known in the art. As is well known, the components and relative proportions of such components used in such formulations may be varied to yield the desired characteristics of the resulting foam produced therefrom, in particular the desired E' values at certain temperatures.

As previously mentioned, the damping foam material of the invention is comprised of a first region and a second region. The first region has an E' value at −10° C. that is lower than the E' value at −10° C. of the second region and an E' value at 25° C. that is higher than the E' value at 25° C. of the second region. The expanded (foamed) material of the first region shall sometimes be referred to herein as "the first region foam." An unexpanded composition used to obtain or produce the first region foam shall sometimes be referred to herein as "the first region foam precursor." The expanded (foamed) material of the second region shall sometimes be referred to herein as "the second region foam." An unexpanded composition used to obtain or produce the second region foam shall sometimes be referred to herein as "the second region foam precursor."

Formulations useful in preparing first and second region foam precursors suitable for use in the present invention may be selected from the products known in the art to be useful in obtaining so-called "high damping foams." Particularly suitable for such purpose is the Terophon® HDF product sold by Henkel AG & Co. KGaA and its affiliates. Also suitable are the thermally expandable materials described in U.S. Patent Application Publication Nos. 2008/0176969 and 2010/0314813, each incorporated herein by reference in its entirety for all purposes. The first and second region foam precursors may be formulated and selected to be different with respect to the E' vs. temperature curves exhibited by the foams produced from such precursors.

In one embodiment of the invention, the foam precursors, once expanded to provide the damping foam material, may have loss factors of at least 0.3, or at least 0.5, or at least 0.8, or at least 1. The loss factors of the first region foam and the second region foam may differ from each other. Moreover, the loss factor of a particular region of the damping foam material may vary with temperature. For example, the first region may have a loss factor at −10° C. that is higher than the loss factor at −10° C. of the second region and a loss factor at 25° C. that is lower than the loss factor at 25° C. of the second region. That is, the first region may exhibit a loss factor at room temperature that is lower than that of the second region, but a loss factor at colder temperatures (e.g., −10° C.) that is higher than that of the second region. In other words, the intrinsic damping characteristics of the first region are not as sensitive to temperature as those of the second region. Thus, at room temperature the second region contributes significantly to the effective acoustic performance of the damping foam material, the first region less so due to its lower loss factor value. As the effectiveness of the second region in controlling vibration drops off more rapidly than that of the first region as the ambient temperature decreases, however, the presence of the first region helps to ensure that the damping foam material still provides an adequate amount of dampening at colder temperatures when incorporated into an assembly as described herein.

The loss factor of a material (also sometimes referred to as the structural intrinsic damping or tan δ) is the ratio of the Young's loss modulus E" over Young's storage modulus E' for the damping in tension compression. For the damping in shear, the loss factor is the ratio of the shear loss modulus G" over the shear storage modulus G'. These values may be readily determined by Dynamic Mechanical Analysis (DMA) of a material, which in the context of this invention is the thermally expandable material after expansion. As is well known in the art, Dynamic Mechanical Analysis can be performed either by an indirect method where the material is characterized on a carrier (Oberst's beam test) or by a direct method where the tested sample is made only from the material to be characterized (viscoanalyzer).

Formulations suitable for use as foam precursors in the present invention may also be selected and adapted from any of the expandable compositions which have been developed as so-called "pillar fillers" or vibration/noise damping foams. Heat activated expandable materials are well known in the art and are described, for example, in the following published applications and patents, each of which is incorporated herein by reference in its entirety for all purposes: U.S. Pat. Nos. 6,150,428; 5,708,042; 5,631,304; 6,830,799; 6,281,260; 5,266,133; 5,573,027; 5,160,465; 5,385,951; 7,247,657; 7,140,668; and 7,199,165; U.S. Patent Publication No. 2004-0266898; and PCT Publication Nos. WO 2008/021200; WO 2007/0276054; WO 2007/117663; WO 2007/117664; and WO 2007/012048.

The first and second region foam precursors may differ primarily in the types of polymeric substances (e.g., thermoplastics, elastomers) used therein. For example, different polymers will, as a consequence of their different monomer compositions, exhibit different glass transition temperatures and modulus properties as a function of temperature. However, other parameters such as the extent of crosslinking achieved (if any) during activation, the type and content of fillers and other additives, and so forth may also be varied to impart the desired characteristics to the damping foam material ultimately produced.

The polymers used in the first and second region foam precursors may, for example, be thermoplastics (including non-elastomeric thermoplastics), elastomers as well as thermoplastic elastomers. Exemplary suitable thermoplastics include ethylene/vinyl-acetate copolymers (EVA), copolymers of ethylene with (meth)acrylate esters (e.g., methyl acrylate and/or butyl acrylate), which optionally may also contain (meth)acrylic acid incorporated proportionately by polymerization. Exemplary suitable elastomers and thermoplastic elastomers include thermoplastic polyurethanes, ethylene propylene diene monomer (EPDM) polymers, alpha-olefin copolymer elastomers, diene polymers, as well as diene/vinyl aromatic copolymers such as random copolymers or block copolymers of styrene with butadiene or isoprene or the hydrogenation products thereof. Specific examples of suitable thermoplastic elastomers include styrene/isoprene/ styrene tri-block copolymers (SIS) and hydrogenated styrene/isoprene/styrene tri-block copolymers. Mixtures of different polymers may be used in the first and second region foam precursors. For example, the foam precursor could contain a mixture of two or more different thermoplastics, or a mixture of two or more different elastomers or thermoplastic elastomers, or a mixture of at least one non-elastomeric thermoplastic and at least one elastomer or thermoplastic elastomer.

The first and second region foam precursors are, in one embodiment of the invention, materials that will foam and expand upon heating but that are typically solid (and optionally, but preferably, dimensionally stable) at room temperature (e.g., 15-30° C.). In some embodiments, the first and second region precursors will be dry and non-tacky, but in other embodiments one or both will be tacky. The first and second region precursors desirably are formulated such that they are capable of being shaped or molded (e.g., by injection molding or extrusion) into the desired form for use, such shaping or molding being carried out at a temperature above room temperature that is sufficient to soften or melt the precursors so that they can be readily processed but below the temperature at which expansion of the precursors is induced. Cooling the shaped or molded precursors to room temperature yields a solid having the desired shape or form. Upon activation, e.g., upon being subjected to a temperature of between about 130° C. and 225° C. (depending on the exact formulation of expandable material that is used), the expandable material will typically expand by at least about 50% or at least 100% or at least about 150% or alternatively at least about 200% of its original volume. Even higher expansion rates (e.g., at least about 1000%) may be selected where required by the desired end use. When used in a vehicle body, for example, the expandable material typically has an activation temperature lower than the temperature at which primer or paint is baked on the vehicle body during manufacture.

Expansion of the thermally expandable material is achieved by a heating step, wherein the thermally expandable material is heated for a time and at a temperature effective to activate the blowing agent and also any curing agent that may be present.

Depending on the nature of the thermally expandable material and the line conditions at the assembly line, the heating step is typically carried out at a temperature from 130° C. to 225° C., desirably from 150° C. to 200° C., with a residence time in the oven from about 10 min to about 30 min.

It is advantageous to take benefit of the heating step that follows the passage of the vehicle parts in the generally used electro coating bath (E-coat bath) to cause expansion of the thermally expandable material as the temperature during this heating step is generally sufficient to cause the expected expansion.

In addition to the aforementioned polymers, the first and/or second foam region precursor may comprise one or more additives such as a blowing agent, filler, tackifier (tackifying agent), plasticizer, crosslinking or curing agent, filler, stabilizer, colorant, or the like.

The first and/or second foam region precursor may be pre-cured or cured before blowing ("foaming") by irradiation with actinic radiation, e.g. by visible or UV light, or gamma or electron radiation. In addition to or instead of this physical curing step, the precursor may be cured by at least one chemical curing agent, which is present in the precursor as an additional component. Suitable curing agents include substances capable of inducing free radical reactions, for example organic peroxides including ketone peroxides, diacyl peroxides, peresters, perketals, hydroperoxides and others.

Other suitable curing agents, depending upon the particular polymer or polymers present in the precursor, include curing agents based on sulfur and/or sulfur compounds.

The curing agent may be a latent curing agent, that is, a curing agent that is essentially inert or non-reactive at room temperature but is activated by heating to an elevated temperature (for example, a temperature within the range of from about 130° C. to about 225° C.).

All known blowing agents, such as "chemical blowing agents" which liberate gases by decomposition or "physical blowing agents", i.e., expanding hollow beads (also sometimes referred to as expandable microspheres), are suitable as a blowing agent in the first and/or second foam region precursors of the present invention. Mixtures of different blowing agents may be used to advantage; for example, a blowing agent having a relatively low activation temperature may be used in combination with a blowing agent having a relatively high activation temperature.

Examples of "chemical blowing agents" include azo, hydrazide, nitroso and carbazide compounds.

"Chemical blowing agents" may benefit from the presence of additional catalysts or activators such as zinc compounds (e.g., zinc oxide), (modified) ureas and the like.

Examples of suitable fillers include inorganic substances such as ground and precipitated chalks, talc, calcium carbonate, carbon black, calcium-magnesium carbonates, barite, clay, mica, and silicate fillers of the aluminum-magnesium-calcium type, such as wollastonite and chlorite. The filler particles may have a particle size in the range of 25 to 250 μm.

Examples of suitable plasticizers include, for example, $C_{1-10}$ alkyl esters of dibasic acids (e.g., phthalate esters), diaryl ethers, benzoates of polyalkylene glycols, organic phosphates, and alkylsulfonic acid esters of phenol or cresol.

Suitable antioxidants and stabilizers include, without limitation, sterically hindered phenols and/or thioethers, sterically hindered aromatic amines and the like.

In one embodiment, one or both of the first and second region foam precursors are formulated using components which lead to a closed-cell foam after expansion of the material by heating. Polymers which are at least partly film-forming may be selected so as to contribute to the formation of a closed-cell foam, as the polymers are stretched without rupture during the foaming process. A closed-cell foam is preferred as it cannot be filled with or penetrated by water.

According to one desirable aspect of the invention, the first and second region foam precursors are formulated such that they are similar to each other with respect to their foaming and heat softening characteristics. For example, the blowing agent systems employed in each may be selected such that each precursor undergoes expansion within approximately the same temperature window. Likewise, the polymers used in the precursors may be chosen such that they soften sufficiently within that temperature window so as to permit controlled expansion (that is, the formulations are sufficiently softened or liquefied such that they each become capable of being expanded by the volatile blowing agent that is generated, yet are not so reduced in viscosity at those temperatures that the foam collapses due to insufficient retention of the bubbles present in the expanding polymeric matrix).

In one aspect, the present invention comprises a system for the damping of vibration in an automotive closure panel assembly, comprising: a) an intrusion device associated with an automotive exterior panel structure, and b) a thermally expandable material for damping vibration disposed over at least a portion of said intrusion device and in contact with said intrusion device prior to expansion of said expandable material, and with a surface of said exterior panel after expansion of said expandable material, wherein the thermally expandable material when expanded provides a damping foam material in accordance with the present invention.

Figure 3A:
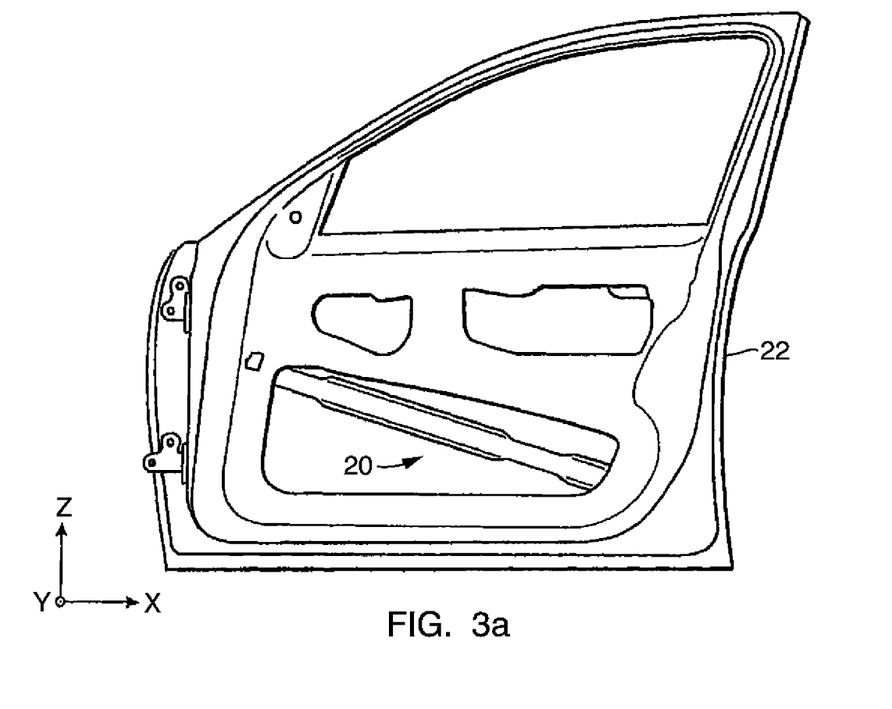
FIG. 3 shows a vehicle door within which is installed a door intrusion device having an expandable material disposed on a surface thereof, in accordance with an aspect of the invention.
Figure 3B:
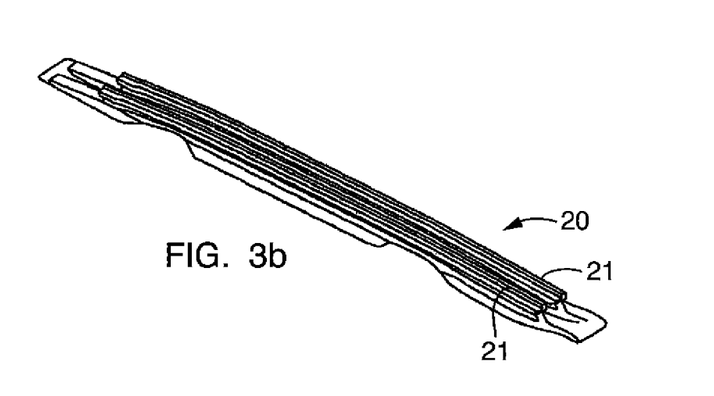

Such a system may be used to damp vibrations of a car door. This aspect is illustrated in FIG. 3 of the present patent application. FIG. 3a (upper drawing) is a side view of a car door 22 equipped with a reinforcement rod (intrusion device) 20 according to the invention. FIG. 3b (lower drawing) is a perspective view of a reinforcement rod (intrusion device) 20 according to the invention partially covered with two stripes of thermally expandable material 21 prior to insertion of the device into the car door and expansion of the thermally expandable material.

In this embodiment, the present invention is directed to a vibration reduction system, and particularly one for automotive frame assemblies, such as (without limitation) vehicle door frame assemblies having a door intrusion device as well as any other automotive closure panel assemblies used in sliding doors, lift gates, or other designs used to facilitate the ingress and egress of passengers and/or cargo to an automotive vehicle. The system may employ extrusion techniques in the form of a mini-applicator technology for facilitating the application of an expandable material according to this invention onto the intrusion device and/or other selected portion of the door frame, such as the belt line reinforcement, through an extrude-in-place process.

Figure 4A:
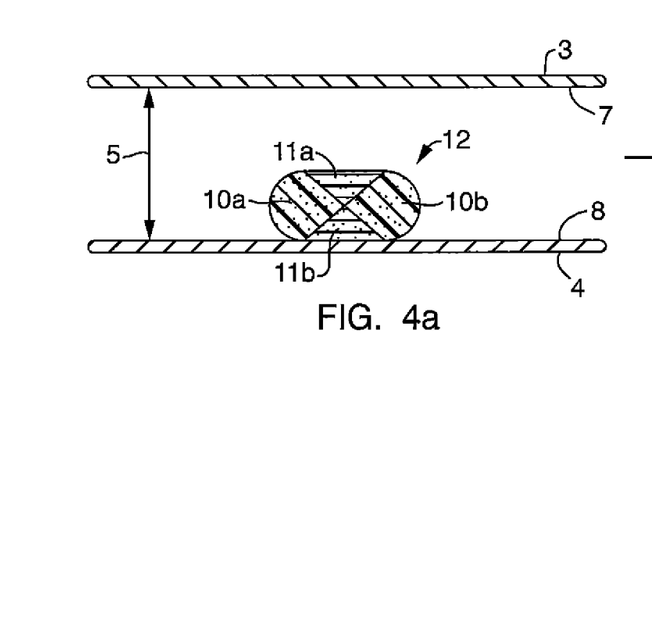
FIG. 4 shows an example of an expandable material disposed on a substrate surface in accordance with the present invention which is expanded to provide a damping foam material within a cavity.
Figure 4B:
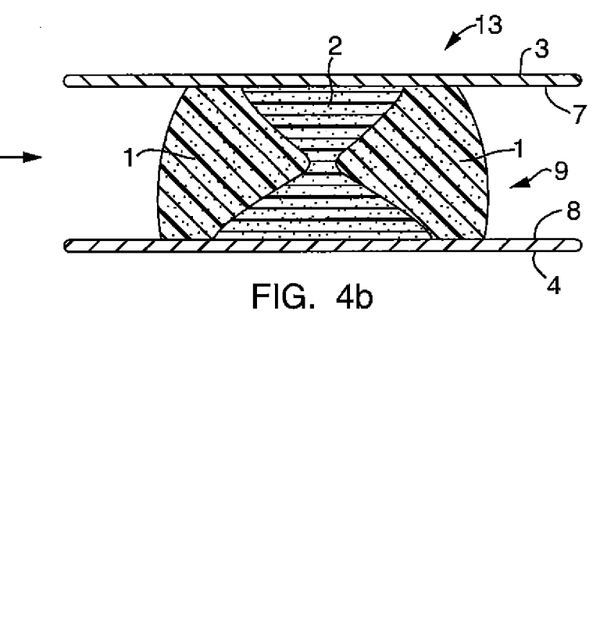

FIG. 4 further illustrates the present invention. In FIG. 4a, an expandable material 12 is disposed on a surface 8 of a substrate 4, which may, for example, be an exterior-facing surface of an intrusion device such as a door side impact beam. Expandable material 12 is comprised of a first region foam precursor 10 (containing a first precursor portion 10a of the first region and a second precursor portion 10b of the first region) and a second precursor portion 11 (containing a first precursor portion 11a of the second region and a second precursor portion 11b of the second region). The first and second region foam precursors differ compositionally, but each contains at least one polymer and at least one heat-activated blowing agent. Substrate 4 having expandable material 12 disposed thereon is positioned such that surface 8 faces surface 7 of substrate 3, which may, for example, be the exterior metal panel of a vehicle door. The expandable material is thereafter subjected to a temperature effective to activate the blowing agent(s) contained in the first and second foam precursors 10 and 11, causing each to expand (foam). The expanding expandable material increases in volume such that it spans across space 5 between substrates 3 and 4 to provide damping foam material 9, as shown in FIG. 4b. Damping foam material 9 is comprised of a first region 1 (derived from first region foam precursor 10) and a second region 2 (derived from second region foam precursor 11). The first region 1 has an E' value at −10° C. that is lower than the E' value at −10° C. of the second region 2. At 25° C., however, second region 2 has an E' value that is lower than that of first region 1, thereby providing better acoustic performance at such temperature than would be realized using a damping foam material containing first region foam 1 only. Second region 2 has a variable cross-sectional width and has, in this example, an hourglass shape. That is, the width of second region 2 varies when viewed in cross-section, i.e., its width is non-uniform. The assembly 13 thereby provided exhibits good acoustic performance (vibration damping) over a broad temperature range.

It is contemplated that the expandable material disclosed in the present invention functions as an anti-vibration dampener when expanded and bonded to the door intrusion device and optionally the inner and/or outer body panels, when the intrusion device, such as a door intrusion device (now attached to the vehicle in the assembly operation), is processed through paint operations and process cycles typically encountered in a vehicle assembly plant. The material is heat expandable and at least partially fills the cavity linking the door intrusion device and the inner and outer door panel during the painting operation, thereby reducing noise and vibration characteristics of the vehicle as well as producing a more quiet door assembly when the vehicle door is opened and closed.

The present invention can be utilized by either the door intrusion device manufacturer or the vehicle manufacturer and extruded onto the door intrusion device itself for use by the vehicle manufacturer in the final assembly operation.

In one embodiment, the expandable material comprises a plurality of portions or a bead, stripe, or ribbon (or a plurality of beads, stripes or ribbons) that is extruded along and onto portions of the intrusion device in a solid (though pliable) form. The expandable material then expands and bonds to the intrusion device and the body panel when exposed to the e-coat process as well as other paint operation cycles encountered in a final vehicle assembly facility.

In a particular non-limiting embodiment, a plurality of pellets comprised of the first foam region precursor and a plurality of pellets comprised of the second foam region precursor are each transformed from a solid or dry chemical state to a visco-elastic stage through the use of a suitable applicator which processes the pellets at a temperature sufficient to transform the pellets into viscoelastic materials capable of flowing onto the external surface of an intrusion device in a desired consistency, thickness, and pattern. In one embodiment, the first and second foam region precursors are co-extruded through a suitable die arrangement so as to provide a damping foam material precursor (expandable material) containing separate regions of first and second foam region precursors. That is, when the damping foam material precursor is examined in cross-section, at least one region comprised of the first foam region precursor and at least one region comprised of the second foam region precursor are present as distinct, separate regions (although some limited intermingling or mixing of the precursors at the interfaces between the regions may take place). Interstitial spaces may exist between these different regions in the expandable material, which may be closed or filled up as the regions expand. The different regions could also abut each other such that no spaces between them are present. Other techniques besides co-extrusion may be utilized to produce the expandable material, such as, for example, injection molding, co-molding, overmolding and the like.

The intrusion device may then be mounted within an automotive door assembly or other panel assembly by the vehicle manufacturer in accordance with manufacturing techniques that are well known in the art. As the assembly is prepared before final assembly of the vehicle, it is processed through e-coat or other heat-inducing paint operations which result in expansion and bonding of the expandable material from the intrusion device to either or both of the outer panel or the inner panel of the selected automotive closure panel, such as a door frame assembly having an inner door panel and an outer door panel, where it cures and remains in place. It is contemplated that the expandable material expands from the external surface of the intrusion device and contacts or possibly bonds to another substrate surface, which can comprise either or both of a door inner panel and the door outer panel, thereby serving to reduce the noise and vibration emanating from the door assembly. Although one embodiment discloses the damping foam material produced from the expandable material essentially spanning from the external surface of an intrusion device, such as a door intrusion beam, into contact with the door outer panel, it will be appreciated that various patterns and applications of the expandable material along the intrusion device would allow the material to expand and to adhere to either or both of the door inner panel and door outer panel as well as any other substrate that may be utilized or encountered in a door assembly or other application which would facilitate either passenger of cargo access to a vehicle.

In one embodiment, the expandable material comprising the first and second foam region precursors is co-extruded-in-place onto an intrusion device in a continuous or non-continuous co-extrusion adjacent to one or more inner walls defining a cavity within an automotive door assembly. The expandable material is activated to accomplish transformation (e.g. expansion or flow) of the first and second foam region precursors within the cavity after the door assembly is mounted onto the vehicle and the vehicle is exposed to heat as it is processed through the e-coat and paint operation cycles of a final automotive assembly plant, which is well known in the art. The resulting structure includes a wall or expansive extrusion that is coated over at least a portion of its surface with the damping foam material acting to reduce vibration during transport and during functional operation of the door assembly.

FIG. 3 illustrates an example of an automotive door frame assembly typically encountered in the manufacture of automotive vehicles which includes a door intrusion device. It is common for such structures to include a plurality of hollow-portioned panel members that are joined and shaped to define the door inner panel, within which there are cavities.

Examples of suitable door frame assemblies may include cargo doors, lift gates, hatchbacks, sliding doors, easy access third doors, door handles, locks, window assemblies or other vehicle doors and door components, sub-frame construction, or the like. One such structure in FIG. 3, for purposes of illustration (without limitation) includes a door intrusion device which may be in the form of a door intrusion beam. Although the present invention may be used in other portions of a door frame assembly that do not require the presence of a door intrusion device as well as other automotive closure panel assemblies other than doors, the intrusion device is typically comprised of metal (e.g., steel, aluminum, magnesium based, or the like) and may be cold stamped, hot stamped, roll-formed, a tubular beam, a hollow tubular beam, or a hydra-formed section. It is also contemplated that the intrusion device could be formed of composite or other high strength polymeric materials depending upon the structural reinforcement and other characteristics required for specific applications of the present invention.

Vibration reduction of the assembly and door intrusion device may be accomplished according to the present invention by extrusion of an appropriate pattern of an expandable material of the present invention disposed along either or both of the intrusion device or other selected portion of the door frame assembly such as the belt-line reinforcement member which is formed between the assembly and a corresponding window structure or other portion of the assembly suitable for application of the expandable material.

The result of this process, after expanding the expandable material (by application of heat, for example), is a vehicle comprising a closure panel assembly with the system for the absorption of vibration as described above, wherein the expandable material is in an expanded state (i.e., has been converted to a damping foam material). The damping foam material is characterized by being comprised of a first region and a second region, wherein the first region has an E' value at −10° C. that is lower than the E' value of the second region at the same temperature and an E' value at 25° C. that is higher than the E' value at 25° C. of the second region, the second region having a variable cross-sectional width. Such a vehicle is within the scope of the present invention.

In one desirable embodiment, the damping foam material is formulated such that it is relatively low in density (e.g., less than 1200 kg/m$^3$) so that the resulting dampened assembly (e.g., vehicle door) remains relatively low in weight, thereby providing vehicles with improved fuel economy.

The damping foam material may also be pre-formed before being assembled together with the first and second substrates. For example, the damping foam material could be directly co-extruded as a foamed material, which is then cut into portions of the desired size and shape. These portions could then be disposed on a surface of the first or second substrate, being held in place by adhesive or mechanical means. In yet another aspect of the invention, one or more portions of the pre-formed damping foam material could simply be placed between the substrates and compressed slightly so that they are held in place by frictional forces. Still another embodiment of the invention involves extruding the damping foam material directly in place as an already-formed foam on a substrate such as an intrusion device, rather than using a thermally expandable material that is foamed by heating after being disposed on the substrate.

In another embodiment of the invention, the first and second foam region precursors may be separately formed (by extrusion or injection molding, for example) and then assembled to provide a damping foam material precursor. An adhesive may be used to secure portions of the first and second foam region precursors together in the desired configuration. The portions of the first and second foam region precursors could also be held together by mechanical means such as clips, fasteners, pins and the like. The shapes of such portions may also be designed such that the first and second foam region precursors lock together. In one embodiment, a portion of the second foam region precursor is formed by extrusion or molding and one or more portions of the first foam region precursor then overmolded onto the preformed portion of the second foam region precursor. The portions may be secured to each other by mechanical interlocking or by the adhesion of the surfaces of the portions to each other (e.g., one or both of the first and second foam region precursors may have the characteristics of a hot melt adhesive such that when applied in a melted or liquefied state to another precursor portion, it adheres to the surface of that other precursor portion when cooled and re-solidified).

In yet another embodiment of the invention, the portions of the first and second foam region precursors are not in contact with each other, but instead are separated. The separate portions may be disposed on the surface of a substrate in a configuration such that when they are activated by heating, the portions foam to provide a damping foam material and an assembly in accordance with the present invention. In one embodiment, the portions foam (expand) such that they come into contact with each other (e.g., gaps or separations initially present between the portions become filled or closed as a result of the expansion in volume of the precursors. In another embodiment, however, the foamed portions remain separated, in whole or in part.

What is claimed is:

1. An assembly comprising a first substrate and a second substrate, wherein a surface of the first substrate and a surface of the second substrate face each other and define a space between the first substrate and the second substrate, and wherein a damping foam material is positioned within the space and spans from the surface of the first substrate to the surface of the second substrate, the damping foam material being comprised of at least one first region and at least one second region, wherein the first region has an E' value at −10° C. that is lower than the E' value at −10° C. of the second region; the first region has an E' value at 25° C. that is higher than the E' value at 25° C. of the second region; and the second region has a variable cross-sectional width.

2. The assembly of claim 1, wherein at least one of the first substrate or the second substrate is a thin metal or polymeric panel.

3. A method for damping vibration in one or both of a first substrate and a second substrate arranged so that a surface of the first substrate and a surface of the second substrate face each other and define a space between the first substrate and the second substrate, the method comprising positioning a damping foam material within the space so that the damping foam material spans from the surface of the first substrate to the surface of the second substrate, the damping foam material being comprised of at least one first region and at least one second region, wherein the first region has an E' value at −10° C. that is lower than the E' value at −10° C. of the second region; the first region has an E' value at 25° C. that is higher than the E' value at 25° C. of the second region; and the second region has a variable cross-sectional width.

4. An assembly comprising a substrate having a surface and an expandable material disposed on the surface of the substrate, wherein the expandable material when expanded provides a damping foam material comprised of at least one first region and at least one second region, wherein the first region has an E' value at −10° C. that is lower than the E' value at −10° C. of the second region; the first region has an E' value at 25° C. that is higher than the E' value at 25° C. of the second region; the second region having a variable cross-sectional width.

5. The assembly of claim 4, wherein the expandable material has been deposited on the surface of the substrate by extrusion.

6. A system for damping vibration in an automotive closure panel assembly, comprising an intrusion device associated with an automotive exterior panel structure and an expandable material disposed over at least a portion of the intrusion device and in contact with the intrusion device prior to expansion of the expandable material and with an interior surface of the automotive exterior panel structure after expansion of the expandable material, the expandable material when expanded providing a damping foam material comprised of at least one first region and at least one second region, wherein the first region has an E' value at −10° C. that is lower than the E' value at −10° C. of the second region; the first region has an E' value at 25° C. that is higher than the E' value at 25° C. of the second region; and the second region having a variable cross-sectional width.

7. The assembly according to claim 1, wherein the first substrate is an intrusion device associated with an automotive exterior panel structure.

8. The assembly according to claim 1, wherein the intrusion device comprises a door intrusion beam.

9. The assembly according to claim 1, wherein the second substrate is an automotive exterior panel.

10. The assembly according to claim 1, wherein the second region or a plurality of second regions extends substantially from the surface of the first substrate to the surface of the second substrate.

11. The assembly according to claim 1, wherein the second region or plurality of second regions has a cross-sectional shape that is triangular, oval, round, trapezoidal or diamond-shaped.

12. The assembly according to claim 1, wherein portions of the first region are positioned on at least two sides of the second region or plurality of second regions.

13. The assembly according to claim 1, wherein portions of the first region are positioned on and are in contact with at least two sides of the second region or plurality of second regions.

14. The assembly of claim 4, wherein the expandable material is attached to the surface of the substrate.

15. The assembly of claim 4, wherein the expandable material is comprised of at least one thermoplastic polymer and at least one heat-activated blowing agent.

16. The assembly of claim 4, wherein the expandable material is formed by co-extrusion.

* * * * *